Oct. 17, 1950  F. RUIZ  2,525,948
FISHING ROD TIP
Filed Jan. 6, 1950
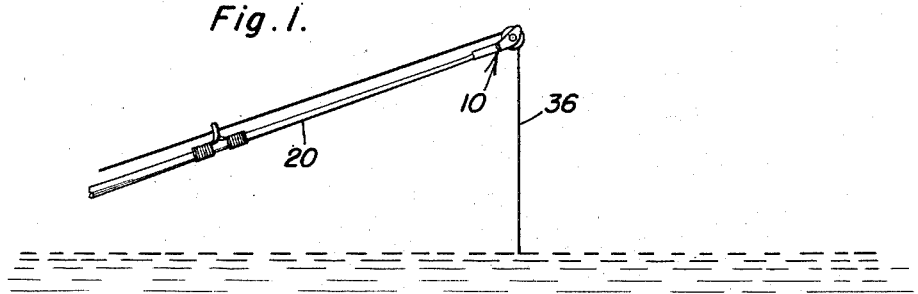
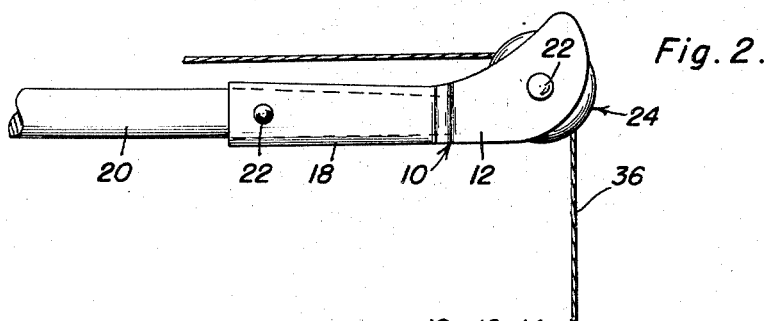
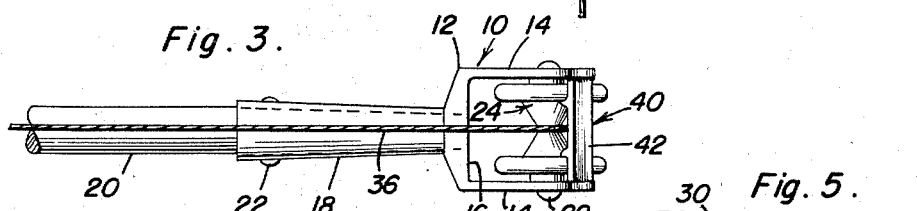
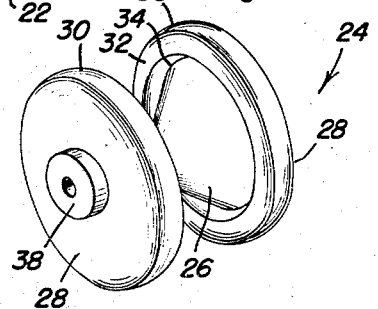
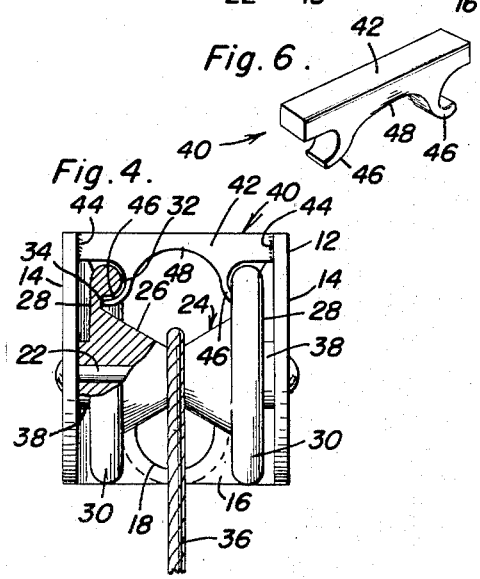
Frank Ruiz
INVENTOR.
BY *Clarence A. O'Brien*
and *Harvey B. Jacobson*
Attorneys Patented Oct. 17, 1950

2,525,948

UNITED STATES PATENT OFFICE 2,525,948

FISHING ROD TIP

Frank Ruiz, New Orleans, La.

Application January 6, 1950, Serial No. 137,203

2 Claims. (Cl. 43—24)

This invention relates to new and useful improvements and structural refinements in fishing rod tips, and the principal object of the invention is to substantially reduce friction and which is customarily involved in passing a fishing line over the outer end of a fishing rod.

This object is achieved by the provision of a fishing rod tip including a freely rotatable line engaging roller, together with a line retainer for preventing the fishing line from becoming disengaged from the roller, thus avoiding any undue friction or entanglement.

Some of the advantages of the invention reside in its simplicity of construction, in its efficient operation, and in its adaptability for use on fishing rods of different sizes and types.

With the above more important objects and features in view and such other objects and features as may become apparent as this specification proceeds, the invention consists essentially of the construction and arrangement of parts as shown in the accompanying drawings in which:

Figure 1 is a fragmentary side elevational view of a fishing rod showing the invention in situ thereon;

Figure 2 is a fragmentary side elevational view of the subject shown in Figure 1 but on an enlarged scale;

Figure 3 is a fragmentary top plan view of the subject shown in Figure 2;

Figure 4 is an end view of the subject shown in Figures 2 and 3, this end view being partially broken away so as to reveal the construction of the invention;

Figure 5 is a perspective view of the line engaging roller used in the invention, and;

Figure 6 is a perspective view of the line retainer also used therein.

Like characters of reference are employed to designate like parts in the specification and throughout the several views.

Referring now to the accompanying drawings in detail, the invention is embodied in a fishing rod tip designated generally by the reference character 10, the same embodying in its construction a frame 12 which assumes the configuration of a fork including a pair of spaced side plates 14, a connecting bight portion 16 and a tapered tubular socket 18 for the reception of the outer end portion of a fishing rod 20, there being provided a transverse keeper pin 22 for the purpose of securing the rod 20 in the socket 18, as will be clearly apparent.

A pin or shaft 22 extends transversely between the side plates 14 and carries a rotatable line engaging roller designated generally by the reference character 24, this roller consisting of a main body portion 26 and a pair of lateral flanges 28 which are provided at the peripheral edges thereof with inwardly projecting, annular rims 30 having arcuate inner edge portions 32, as is best shown in Figure 4. Moreover, the main body portion 26 of the roller 24 has a V-shaped outer surface which extends laterally in opposite directions toward the rims 32 but affords a pair of grooves 34 immediately under the respective rims, the purpose of the V-shaped outer surface of the roller portion 26 being, of course, to properly center the fishing line 36 on the roller.

It is to be noted that the roller 24 is provided at the outer surfaces of the flanges 28 with integral bosses 38 for the purpose of spacing the roller from the side plates 14 and sustaining the roller in a properly centralized position in the frame 12, and it will be understood that by virtue of the freely rotatable roller, passage of the fishing line 36 over the outer end of the rod 20 will be facilitated without undue friction.

Means are provided for preventing the fishing line from becoming disengaged from the roller 24, these means consisting of what may be called a line retainer designated generally by the reference character 40 which consists of a bar 42 extending transversely between the side plates 14 above the roller 24 and secured to the side plates by suitable welds 44 (see Figure 4).

A pair of transversely spaced keepers 46 of an arcuate configuration project downwardly and outwardly from the bar 42, these keepers extending adjacent the arcuate inner edges or surfaces 32 of the rims 30 and under the rims into the grooves 34, as is best shown in Figure 4, so that there is no possibility of the fishing line 36 leaving the main body portion 26 of the roller and surmounting one of the flanges 28 to become lodged between the roller and one of the side plates 14.

This protective measure is of utmost importance in the event the fishing rod 20 should be rotated or twisted to one side or the other, and it is to be noted that the under side of the intermediate portion of the retainer bar 42, that is, the intermediate portion between the keepers 46, is formed with a substantially semi-circular or arcuate recess 48 having rounded edges so as to prevent any injury to the fishing line in the event the fishing rod should become inverted.

Finally, it is to be noted that the side plates 14 are shaped so that substantial portions of the peripheral edges of the roller flanges 28 project beyond the corresponding edge portions of the side plates, thus preventing any possibility of a contact between the side plates and the fishing line.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention what is claimed as new is:

1. In a fishing rod tip, the combination of a frame including a pair of spaced side plates, a line engaging roller rotatably mounted between said side plates and including a main body portion and a pair of lateral flanges provided at peripheral edges thereof with inwardly projecting annular rims, and a line retaining member extending transversely between said side plates above said roller and having a pair of downwardly and outwardly projecting keepers extending adjacent the inner surface of and under said rims.

2. In a fishing rod tip, the combination of a frame including a pair of spaced side plates, a shaft extending transversely between said plates, a line engaging roller rotatable on said shaft and including a main body portion and a pair of lateral flanges provided at peripheral edges thereof with inwardly projecting annular rims, the main body portion of said roller having a V-shaped outer surface extending in opposite lateral directions to said rims, and a line retainer comprising a bar secured to and extending transversely between said side plates above said roller, and a pair of transversely spaced keepers projecting downwardly and outwardly from said bar, said keepers extending adjacent the inner surface of and under said rims.

FRANK RUIZ.

REFERENCES CITED

The following references are of record in the file of this patent:

UNITED STATES PATENTS

| Number | Name | Date |
|---|---|---|
| D. 143,398 | Cariddi | Jan. 1, 1946 |
| 35,339 | Vom Hofe | May 20, 1862 |
| 521,704 | David | June 19, 1894 |
| 1,140,868 | Bennett | May 25, 1915 |
| 1,959,989 | Reynolds | May 22, 1934 |
| 2,226,295 | Lee | Dec. 24, 1940 |